United States Patent

[11] 3,532,150

| [72] | Inventor | Hermann Wittneben<br>Hannover, Germany |
|---|---|---|
| [21] | Appl. No. | 599,850 |
| [22] | Filed | Dec. 7, 1966 |
| [45] | Patented | Oct. 6, 1970 |
| [73] | Assignee | Continental Gummi-Werke<br>Aktiengesellschaft, Hannover, Germany |
| [32] | Priority | Dec. 8, 1965 |
| [33] | | Germany |
| [31] | | C 37,620 |

[54] PNEUMATIC VEHICLE TIRE
3 Claims, 2 Drawing Figs.

[52] U.S. Cl. .................................................... 152/354,
152/361
[51] Int. Cl. ...................................................... B60c 9/02,
B60c 9/20
[50] Field of Search ............................................ 152/354,
355, 356, 361, 330

[56] References Cited
UNITED STATES PATENTS
| 2,939,502 | 6/1960 | Hindin et al. ............ | 152/361 |
| 3,404,720 | 10/1968 | Fletcher ................... | 152/354 |

Primary Examiner—Arthur L. La Point
Assistant Examiner—Charles B. Lyon
Attorney—Walter Becker

ABSTRACT: A pneumatic vehicle tire with a pull resistant belt for lateral stabilization of the tire and with a carcass having strength members extending from bead to bead at a substantially right angle with regard to the circumferential direction of the tire, those sections of the strength members which form said carcass and face toward said belt being free from pull stresses in the inflated condition of said tire.

Patented Oct. 6, 1970 3,532,150

PNEUMATIC VEHICLE TIRE

The present invention relates to a pneumatic vehicle tire with a pull-resistant belt for lateral stabilization and with a carcass of thread-shaped reinforcing inserts extending from bead to bead at a right angle or approximately a right angle with regard to the circumferential direction of the tire.

With heretofore known pneumatic tires of the above mentioned type, the so-called belted tire, it is the purpose of the carcass, as is also the case with belt-less tires, to absorb the forces caused by the inner pressure of the tire. In addition thereto, the heretofore known belt-equipped pneumatic vehicle tires are so designed that the reinforcing inserts forming the carcass are subjected over their entire length from bead to bead to a uniform pulling stress in the longitudinal direction of the thread or the like.

It is an object of the present invention, by a special design of the carcass, so to influence the belt that it will be able to absorb relatively large forces necessary for obtaining an increased lateral stabilization.

It is a further object of this invention to provide a pneumatic vehicle tire as set forth in the preceding paragraph which will bring about that the pulling stresses introduced into the carcass within the area of the side walls of the tire will no longer be conveyed through those sections of the carcass which are adjacent to the belt.

These and other objects and advantages of the invention will appear more clearly from the following specification in connection with the accompanying drawing, in which.

Figure 1:
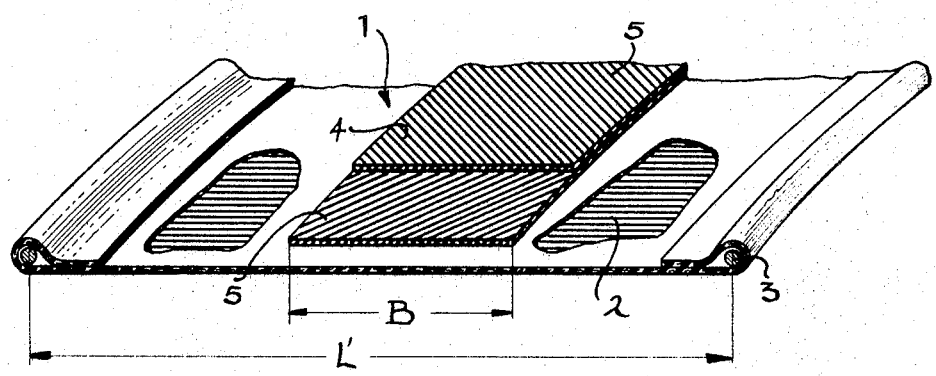
FIG. 1 is an isometric view and partly a section showing a raw tire made in conformity with the flat band method.

A pneumatic vehicle tire according to the present invention is characterized primarily in that those sections of the strength carriers which face the belt and form the carcass are, in inflated condition of the tire, free from pulling stresses. Advantageously, the said sections are in the operative condition of the tire upset or compressed and in particular by about from 10 to 50 percent of the original length. Such a design of the carcass brings about that the pulling stresses introduced into the carcass within the range of the side walls of the tire are no longer conveyed through those sections of the carcass which are adjacent to the belt but are by those sections of the carcass which extend to the side walls of the tire induced into the marginal portions of the belt which as a result thereof is subjected to a correspondingly large pull prestress in the transverse direction of the tire with the result that the lateral stabilizing property of the belt will be greatly increased.

Referring now to the drawing in detail, the tire carcass 1 consists primarily of pull-resistant thread-shaped reinforcing inserts 2, for instance threads, wires, strands, and the like, which extend approximately at a right angle with regard to the circumferential direction of the tire and which are firmly anchored on and looped around the bead cores 3 and extend in uninterrupted manner from bead to bead. The belt 4 surrounds the carcass in the form of an annular band with a flat rectangular cross section. The said belt 4 consists of two or more layers 5 of parallel pull-resistant reinforcing inserts or strength carriers similar to the reinforcing inserts 2, which in the condition of the raw tire shown in FIG. 1 form an angle of approximately 30 to 40° with the circumferential direction of the tire. In a manner known per se the threads, wires, strands or the like of one layer cross those of the adjacent layer in a symmetric arrangement with regard to the circumferential direction of the tire.

Figure 2:
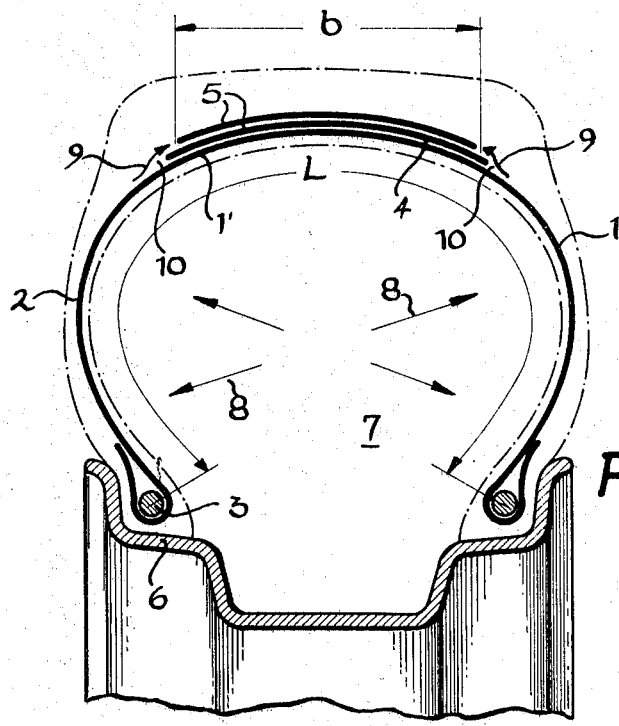
FIG. 2 is a diagrammatic section of a pneumatic tire made from the raw tire of FIG. 1 and placed under operational pressure.

FIG. 2 shows the pneumatic tire made according to FIG. 1 as mounted on a rim 6. The hollow chamber defined by the tire and the rim is under a superatmospheric pressure, for instance a pressure of two atmospheres above atmospheric pressure. The geometric length of the reinforcing inserts 2 forming the carcass 1 is designated with the letter L.

When building up the raw tire according to FIG. 1, that portion of the carcass 1 or of the carcass forming reinforcing inserts located between the beads 3 will have a length L' which is greater than the length L according to FIG. 2. When the raw tire according to FIG. 1 is curved to form the tire, the raw tire will increase in diameter. The diameter of the belt 4 will be greatly increased while the angle of the threads or the like forming the layers 5 will be reduced to an angle of approximately from 15 to 25°. With this increase in diameter, also the width B decreases by approximately 20 percent to the width b. Inasmuch as the length L' is greater than the length L, that section l' of the carcass 1 which is directly adjacent to the belt 4 undergoes an upsetting or compressing action which corresponds to or is dependent on the decrease in the width of the belt 4 during the increase in the diameter of the latter.

When, after the tire has been completed, its hollow chamber 7 is subjected to pressure, the section l' will be tension-free and may even be upset or compressed. The forces 8 caused by the tire inner pressure are therefore not conveyed through the section l' but through the belt 4. The flow of forces is indicated by the arrows 9. The thus effected transverse tension of belt 4 brings about that belt 4 will be able to produce correspondingly larger reaction forces against the lateral forces which occur when the tire passes through a curve. Consequently, at the time the lateral forces are effective, the transverse deformation of the tread strip zone will be less.

It may additionally be mentioned that the transmission of the forces from the reinforcing inserts 2 to the marginal portions of the belt and vice versa is effected at 10 through the intermediate rubber layers vulcanized to the marginal portions of the belt.

I claim:

1. A pneumatic vehicle tire having beads, which includes: a carcass comprising strength members extending radially and from bead to bead in a direction at least approximately at a right angle with regard to the circumferential direction of the tire, and a belt comprising tensile strength stress-carrying thread layers extending in thread-crossing angular relationship in positioning with respect to the circumferential direction of the tire and extending around said carcass, particularly only those sections of said carcass which are adjacent to and face said belt thereunder exclusively being free from tension stresses even in the inflated condition of said tire wherein under internal pressure of said tire collectively said belt and said strength members located in tire side walls are kept always under tension while there is reduction in thread-crossing angular relationship of said belt layers simultaneously with increase in belt diameter and with decrease in belt width transversely pretensioned for increased belt capability to absorb side force in tire side stabilization during curved travel.

2. A vehicle tire according to claim 1, in which those sections of said carcass always free from tension stress have threads which are adjacent to and face said belt located immediately thereunder and which are maintained particularly at all times in compressed tension free condition longitudinally of thread direction also under effect of internal pressure in the inflated condition of said tire.

3. A pneumatic vehicle tire having beads, which includes: a carcass comprising strength carriers extending from bead to bead in a direction at least approximately at a right angle with regard to the circumferential direction of the tire, and a belt on and extending around said carcass, those sections of said carcass which are adjacent to and face said belt being free from tension stresses in the inflated condition of said tire, those sections of said carcass which are adjacent to and face said belt being in upset condition, the strength carriers of said carcass sections which are adjacent to and face said belt being upset by 20 to 50 percent of the length that said strength carriers had prior to the building up of the tire.